US007780511B2

(12) United States Patent
Casey et al.

(10) Patent No.: US 7,780,511 B2
(45) Date of Patent: Aug. 24, 2010

(54) GAMING MACHINE HAVING A FIRST BONUS EVENT THAT INFLUENCES A PROBABILITY OF A SECOND BONUS EVENT

(75) Inventors: Michael P. Casey, Chicago, IL (US); Phillip B. Gelber, Glen Ellyn, IL (US); Lisa M. Helfer, Chicago, IL (US); Matthew J. Ward, Northbrook, IL (US)

(73) Assignee: WMS Gaming Inc., Waukegan, IL (US)

( * ) Notice: Subject to any disclaimer, the term of this patent is extended or adjusted under 35 U.S.C. 154(b) by 649 days.

(21) Appl. No.: 11/196,367

(22) Filed: Aug. 3, 2005

(65) Prior Publication Data

US 2006/0030391 A1 Feb. 9, 2006

Related U.S. Application Data

(60) Provisional application No. 60/599,210, filed on Aug. 5, 2004.

(51) Int. Cl.
*A63F 13/00* (2006.01)

(52) U.S. Cl. ............................ 463/10; 463/16; 463/20; 463/21

(58) Field of Classification Search .................. 463/25, 463/16
See application file for complete search history.

(56) References Cited

U.S. PATENT DOCUMENTS

| | | | | |
|---|---|---|---|---|
| 6,102,798 | A * | 8/2000 | Bennett | 463/16 |
| 6,155,925 | A * | 12/2000 | Giobbi et al. | 463/20 |
| 6,159,097 | A * | 12/2000 | Gura | 463/20 |
| 6,159,098 | A | 12/2000 | Slomiany et al. | |
| 6,190,255 | B1 | 2/2001 | Thomas et al. | |
| 6,203,429 | B1 | 3/2001 | Demar et al. | |
| 6,234,897 | B1 | 5/2001 | Frohm et al. | |
| 6,315,664 | B1 * | 11/2001 | Baerlocher et al. | 463/21 |
| 6,322,309 | B1 | 11/2001 | Thomas et al. | |
| 6,645,074 | B2 | 11/2003 | Thomas et al. | |
| 6,648,757 | B1 | 11/2003 | Slomiany et al. | |
| 6,875,108 | B1 * | 4/2005 | Hughs-Baird | 463/26 |
| 6,905,412 | B2 | 6/2005 | Thomas et al. | |
| 2002/0025844 | A1 * | 2/2002 | Casey et al. | 463/16 |
| 2003/0109307 | A1 * | 6/2003 | Boyd | 463/41 |

* cited by examiner

*Primary Examiner*—John M Hotaing, II
*Assistant Examiner*—Jeffrey Wong
(74) *Attorney, Agent, or Firm*—Nixon Peabody LLP

(57) ABSTRACT

A gaming machine is provided for playing a wagering game. The gaming machine includes a wager-input device and at least one display for displaying a bonus game of the wagering game. The bonus game has a plurality of outcomes. A probability of winning a certain one or more of the plurality of outcomes varies in response to an occurrence of a predetermined event during the bonus game.

18 Claims, 9 Drawing Sheets

GAMING MACHINE HAVING A FIRST BONUS EVENT THAT INFLUENCES A PROBABILITY OF A SECOND BONUS EVENT

PRIORITY

This application claims the benefit of priority under 35 U.S.C. §119 of provisional application Ser. No. 60/599,210, filed Aug. 5, 2004, the contents of which are hereby incorporated by reference in their entirety as if fully set forth.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines, and methods for playing wagering games, and more particularly, to a gaming machine providing a bonus game where an occurrence of a first event during the bonus game influences a probability of an occurrence second event.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and tile expectation of winning each machine is roughly the same (or believed to be the same), players are most likely to be attracted to the most entertaining and exciting of the machines. Shrewd operators consequently strive to employ the most entertaining and exciting, machines available because such machines attract frequent play and hence increase profitability to the operator. Accordingly, in the competitive gaming industry, there is a continuing need for slot machine manufacturers to produce new types of games, or enhancements to existing games, which will attract frequent play by enhancing the entertainment value and excitement associated with the game.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming machines with new types of bonus games to satisfy the demands of players and operators.

There are wagering games in the art that provide a bonus game where an outcome (e.g., a payout) during the bonus game is dependent upon the occurrence of an event outside of the bonus game. For example, one wagering game includes a plurality of different start-bonus triggers in a basic game for triggering the bonus game. A probability of winning a certain outcome is dependent upon the start-bonus trigger achieved/obtained during the basic game. For example, one of the start-bonus triggers may increase the probability that the player will achieve a high payout during the bonus game. However, the player can only increase the probability of achieving a certain bonus game outcome while in the basic game, but once the bonus game has started, the player has no way improving his/her probability of achieving the certain bonus outcome.

Wagering games need to include additional features that will maintain the player's interest and enhance entertainment. The present invention is directed to satisfying this and other needs.

SUMMARY OF THE INVENTION

According to one aspect of the present invention, a gaming machine is provided for playing a wagering game. The gaming machine includes a wager-input device and at least one display for displaying a bonus game of the wagering game. The bonus game has a plurality of outcomes. A probability of winning a certain one or more of the plurality of outcomes varies in response to an occurrence of a predetermined event during the bonus game.

According to another aspect of the invention, a method of conducting a wagering game includes displaying a bonus game of the wagering game. The bonus game has a plurality of outcomes. A probability of winning a certain one or more of the plurality of outcomes varies in response to an occurrence of a predetermined event during the bonus game.

According to yet another aspect of the invention, a computer readable storage medium is encoded with instructions for directing a gaming device to perform the method described above.

An additional aspect of the invention is directed to a gaming system for playing a wagering game. The gaming system includes at least one display and a controller coupled to the display. The controller is programmed to display a bonus game of the wagering game. The bonus game has a plurality of outcomes. The controller is further programmed to vary a probability of winning a certain one or more of the plurality of outcomes in response to an occurrence of a predetermined event during the bonus game.

Additional aspects of the invention will be apparent to those of ordinary skill in the art in view of the detailed description of various embodiments, which is made with reference to the drawings, a brief description of which is provided below.

DETAILED DESCRIPTION

Figure 1:
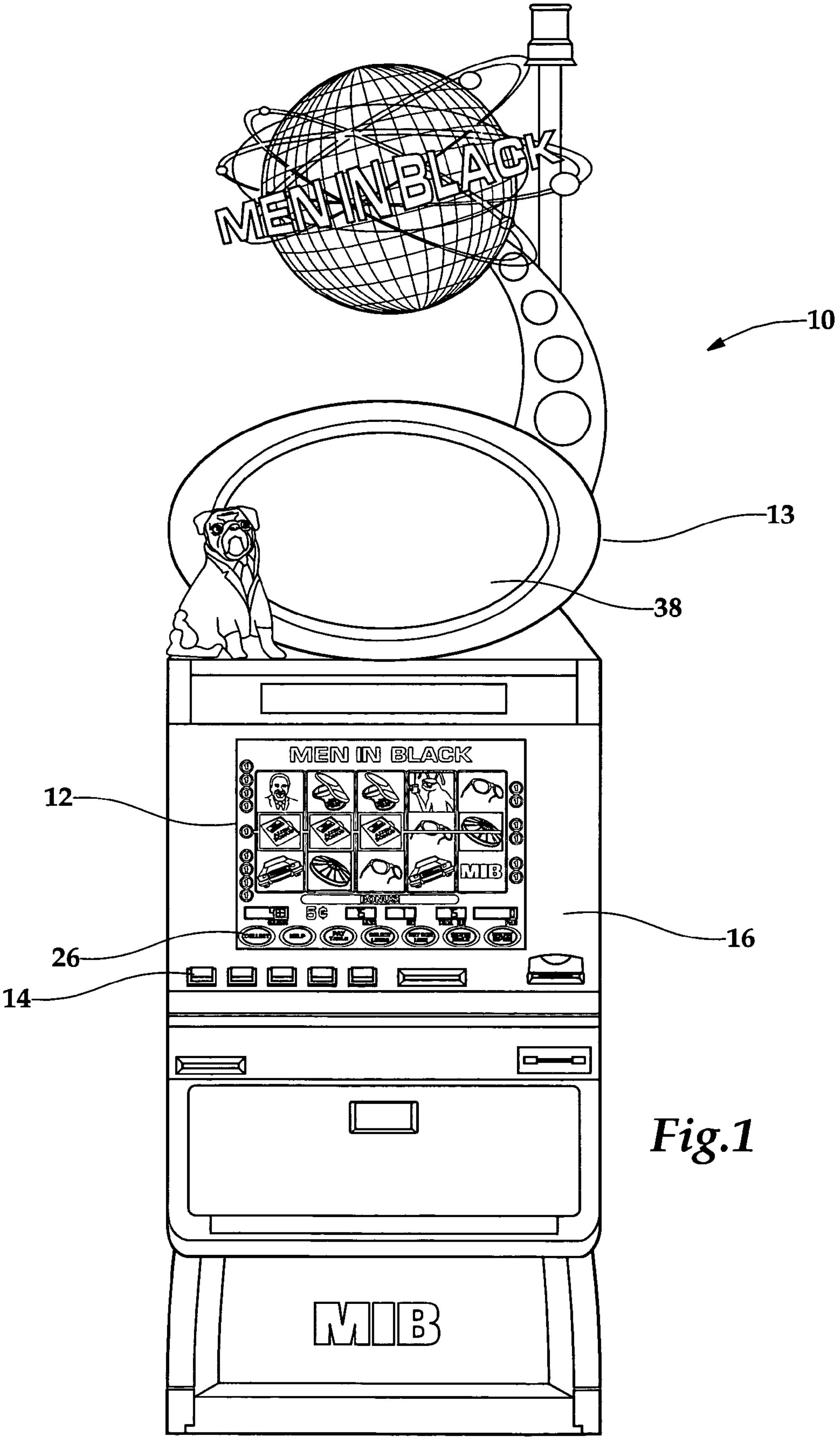
FIG. 1 is a perspective view of a gaming machine embodying the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Turning now to the drawings and referring initially to FIG. 1, there is shown a gaming machine 10 for conducting a wagering game in accordance with the present invention. The gaming machine 10 comprises a primary display 12 that may, for example, be a mechanical reel slot display or a video display. If implemented in video, the primary display 12 may comprise a cathode ray tube (CRT), liquid crystal display (LCD), plasma, or generally any other type of video display known in the art. In the illustrated embodiment, the, gaming machine 10 is an "upright" version in which the primary display 12 is oriented vertically relative to the player. It will be appreciated, however, that any of several other models of gaming machines are within the scope of the present invention including, for example, a "slant-top" version in which the primary display 12 is slanted at about a thirty-degree angle toward the player. The gaming machine may include a secondary display 38 in top box 13, depending upon the design of the wagering game.

The gaming machine 10 includes a button panel 14 and an optional touch screen 16 for enabling a player to conduct the wagering game. The button panel 14 and the touch screen 16 may have some corresponding buttons for performing the same functions and other buttons for performing different functions. By way of example, a "$" button may be pressed to insert money to increase a player's credits. A "Change Denom" button may be touched to change denomination. A "Collect" button may be touched to Collect winnings. A "Pay Table" button may be touched to see the game's pay table. A "Select Lines" button may be touched to change the number of pay lines bet. A "Bet Per Line" button may be touched to change the amount of credits bet on each line. The number of lines to play is generally selected prior to selecting the amount to bet per line. A "Spin Reels" button may be touched to begin the game. A "Stop Reels" button may be touched to stop the reels while they are spinning. If the player does not touch the "Stop Reels" button, the reels will stop on their own. A "Max Bet Spin" button may be touched to play the maximum credits instantly.

Figure 2:
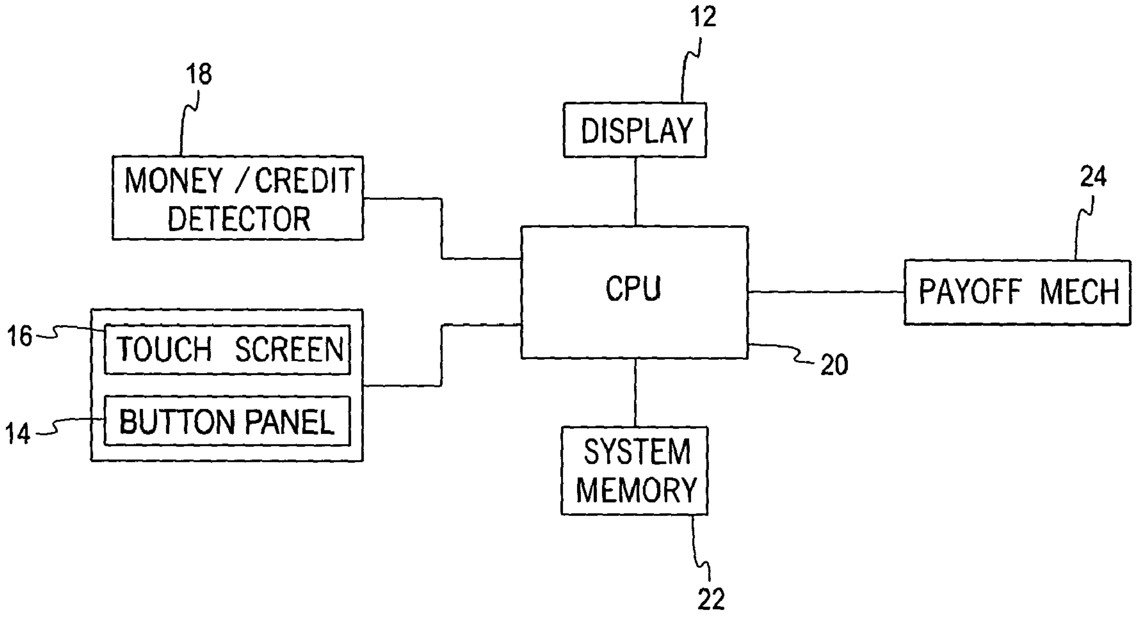
FIG. 2 is a block diagram of a control system suitable for operating the gaming machine.

FIG. 2 is a block diagram of a control system suitable for operating the gaming machine. Money/credit detector 18 signals a central processing unit (CPU) 20 when a player has inserted money or played a number of credits. The money may be provided by coins, bills, tickets, coupons, cards, etc. Using the button panel 14 or touch screen 16, the player may select any game variables (e.g., number of pay lines in a reel slot game if more than one can be selected) and place his/her wager to play the wagering game. In a play of the game, the CPU 20 generates at least one random event using a random number generator (RNG) and provides an award to the player for a winning outcome of the random event. Alternatively, the random event may be generated by a remote computer using an RNG or pooling schema and then transmitted to the gaming machine. The CPU 20 operates the primary display 12 to represent the random event(s) and outcome(s) in a visual form that can be understood by the player. In addition to the CPU 20, the control system may include one or more additional slave control units for operating one or more Peripherals. The terms "processor" and "CPU" as used herein are each intended to collectively cover the CPU 20 and any and all such control units.

A system memory 22 stores control software, operational instructions and data associated with the gaming machine. In one embodiment, the system memory 22 comprises a separate read-only memory (ROM) and battery-backed random-access memory (RAM). However, it will be appreciated that the system memory 22 may be implemented on any of several alternative types of memory structures or may be implemented on a single memory structure. A payoff mechanism 24 is operable in response to instructions from the CPU 20 to award a payoff to the player. The payoff may, for example, be in the form of a number of credits. The number of credits are determined by one or more math tables stored in the system memory 22.

The wagering game is described below wherein the basic game is a multi-line, multi-coin video reel slot game. It should, however, be understood that the basic game may be any type of wagering game, including but not limited to video or mechanical reel slots (one or more pay lines), poker, keno, bingo, blackjack, or roulette.

Referring back to FIG. 1, to play a basic game in the form of reel slots, a player may select a number of pay lines using the "Select Lines" button, place a wager on each line using the "Bet Per Line" button, and start the reels 26 in motion using the "Spin Reels" button. Alternatively, the player may select all lines, play the maximum bet or, each line, and start the reels 26 in motion using the "Max Bet Spin" button. In response to pressing the "Max Bet Spin" button, or a "Spin Reels" button for a wager less than the maximum, the CPU spins and randomly stops the plurality of symbol-bearing reels 26 to place symbols on the reels 26 in visual association with a number of pay lines. Other mechanisms, such as a handle, may be used to set the reels 26 in motion. The number of pay lines may, for example, be nine, fifteen, or twenty, but more or less pay lines may be provided is desired. As noted above, the primary display 12 on which the reels are implemented may be mechanical or video. If the primary display 12 is video, the reels are simulated with moving graphics. If, however, the primary display 12 is mechanical, the reels are physical and rotatably driven by stepper motors.

The CPU 20 may use a random number generator to select a game outcome (e.g., "basic" game outcome) corresponding to a particular set of reel "stop positions." The CPU 20 then causes each of the reels 26 to stop at the appropriate stop position. Symbols are displayed on the reels 26 to graphically illustrate the reel stop positions and indicate whether the stop positions of the reels 26 represent a winning game outcome. Winning basic game outcomes (e.g., symbol combinations resulting in payment of coins or credits) are identifiable to the player by a pay table. The pay table may be affixed to the machine 10 and or displayed by the primary display 12 in response to a command by the player (e.g. by pressing the "Pay Table" button). A winning basic game outcome occurs when the symbols appearing on the reels 26 along an active pay line correspond to one of the winning combinations on the pay table. A winning combination could, for example, be three or more matching symbols along an active pay line, where the award is greater as the number of matching symbols along the active pay line increases. If the displayed symbols stop in a winning combination, the game credits the player an amount corresponding to the award in the pay table for that combination multiplied by the number of wagered credits. The player may collect the amount of accumulated credits by pressing the "Collect" button.

Included among the plurality of basic game outcomes are one or more start-bonus outcomes for triggering play of bonus games. A start-bonus outcome may be defined in any number of ways. For example, a start-bonus outcome may occur when a special start-bonus symbol or a special combination of symbols appears on one or more of the reels 26. A start-bonus outcome may require the combination of symbols to appear along an active pay line, or may alternatively require that the combination of symbols appear anywhere on the display regardless of whether the symbols are along an active pay line. The appearance of a start-bonus outcome causes the CPU to shift operation from the basic slot game to the bonus game associated with that start-bonus outcome.

Embodiments of the invention are directed to a wagering game having a basic game and a bonus game. The bonus game includes multiple events or stages. A certain occurrence in a first bonus event changes the excepted value ("EV") of a second event by changing a probability of achieving a higher payout in a second bonus event. For example, if the bonus game includes two events where the player has to select from among various player-selectable elements, if the player selects a certain player selectable element during the first event, the probability of the player achieving a high payout during the second event is greater than it would have been if the player had selected a different player selectable element during the first event.

The wagering game may implement a "Men In Black"™ theme with several available bonuses. Three of the bonus games, the "Find the Alien Bonus," the "Neuralizer Bonus," and the "Space Bonus" are described below.

Figure 3:
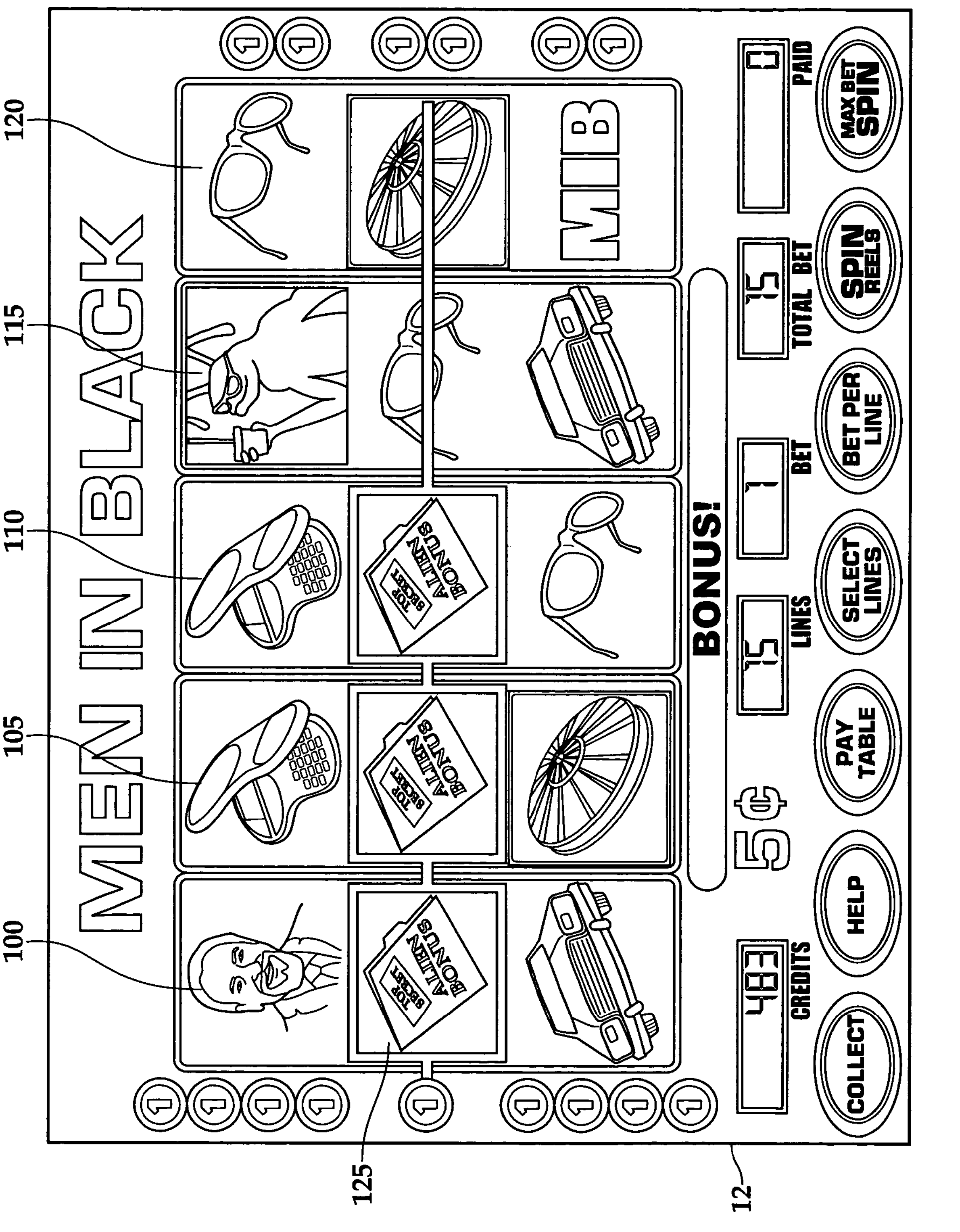
FIG. 3 illustrates a video slot game having five reels according to an embodiment of the invention.

FIG. 3 illustrates a video slot game having five reels 100, 105, 110, 115, and 120. In other embodiments, more or fewer than five reels may be utilized. As shown, three visible symbols are displayed on each of the reels. In other embodiments, more or fewer than three visible symbols may be displayed on each of the reels. The player may be awarded with a payout when a winning combination of, e.g., three of the same symbol are located on an active winning pay line after the reels in the slot wagering game come to rest after a spin. The player may also be awarded with a bonus game, such as the "Find the Alien Bonus" game.

The "Find the Alien Bonus" game may be triggered by a combination of at least three "Alien Bonus" symbols 125 on an active pay line. In other embodiments, the "Find the Alien Bonus" game is only available when the player has wagered on the maximum number of pay lines. In additional embodiments, more or fewer than three "Alien Bonus" symbols 125 on an active pay line trigger the "Find the Alien Bonus" game. Additional embodiments trigger the "Find the Alien Bonus" game when at least three of the "Alien Bonus" symbols 125 are displayed anywhere on the five reels 100, 105, 110, 115, and 120.

As shown in FIG. 3, the player has achieved a combination of three "Alien Bonus" symbols 125 as the middle visible symbols on the first, second, and third reels 100, 105, and 110. Accordingly, the "Find the Alien Bonus" game is triggered in the event that these "Alien Bonus" symbols 125 are located on an active pay line.

Figure 4A:
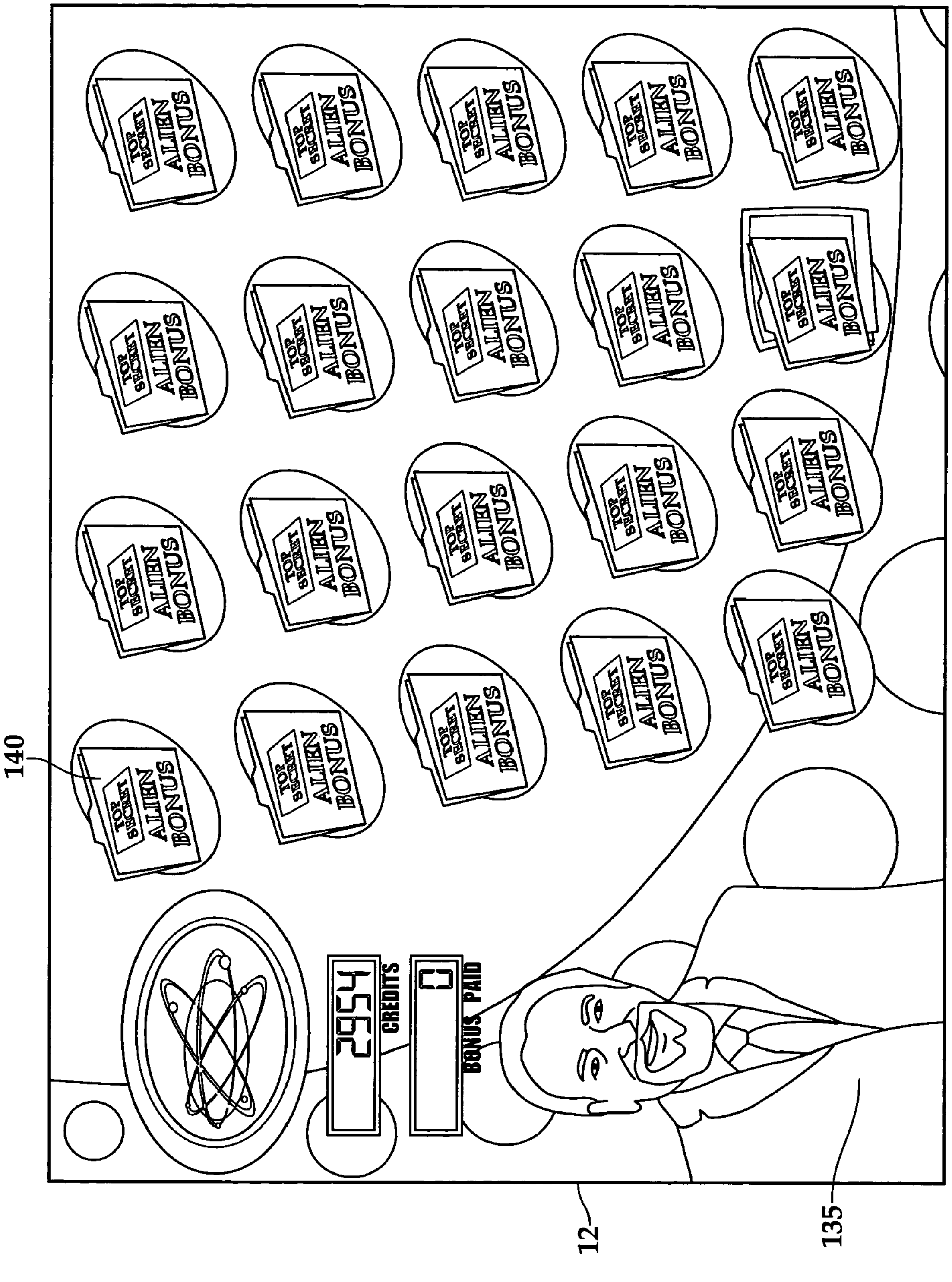
FIGS. 4A and 4B illustrate a first stage or event of the "Find the Alien Bonus" game according to an embodiment of the invention.
Figure 4B:
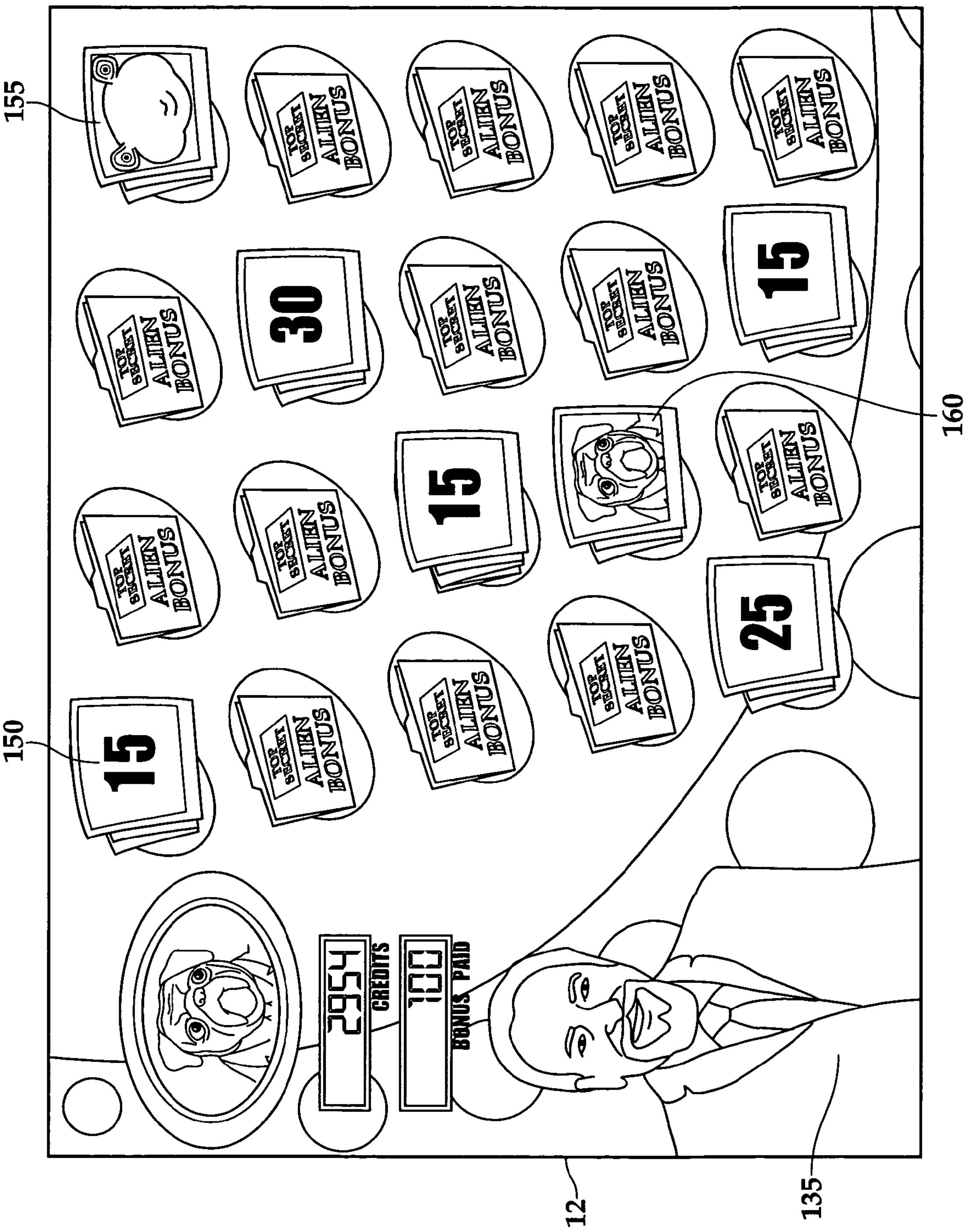

FIGS. 4A and 4B illustrate a first stage or event of the "Find the Alien Bonus" game according to an embodiment of the invention. After the "Find the Alien Bonus" game has been triggered, a new screen is displayed on the display 12. As shown, a "Zed" symbol 135 is located on the left-hand side of the display 12. The "Zed" symbol 135 informs the player that selections of a plurality of player-selectable elements 140 are to be made. The "Zed" symbol 135 may be located anywhere on the screen of the display 12 and may, e.g., provide audible instructions to the player regarding how may selections of the player-selectable elements 140 are to be made.

The player may be instructed to select player-selectable elements 140 until a certain player-selectable element is selected that is associated with an item that ends the selecting (e.g., when the player selects a player-selectable element 140 associated with an "alien wanted" poster symbol 155, described below, the player is not allowed to make more selections, and bonus game play proceeds to the next bonus game stage shown in FIGS. 5-7). In other embodiments, the player may be instructed to select seven of the player-selectable elements. In additional embodiments, more or fewer than seven of the player-selectable elements 140 may be selected. Also, the number of selections of the player-selectable elements 140 that the player is given may be randomly selected or may be pre-determined.

Each of the player-selectable elements 140, e.g., either masks an associated item of value or ends the player's selecting of the player-selectable elements. After the player's selections have been made, the masked items are displayed to the player, as shown in FIG. 4B. Items assigned to, and masked by, the player-selectable elements 140 include credit amount symbols 150, "alien wanted" poster symbols 155, and "Pug the dog" symbols 160. The credit amount symbols 150 provide credit amounts to the player. As discussed below, the "alien wanted" poster symbol 155 may, e.g., end the selection stage. The "Pug the dog" symbol 160 increases the probability of the player winning a relatively large payout during a second event or stage of the bonus game, as described below with respect to FIGS. 5-7.

As illustrated in FIG. 4B, the player made seven selections of the player-selectable elements, unmasking (a) credit awards 150 of 15, 30, 15, 25, and 15 credits; (b) an alien bonus poster symbol 155; and (c) a "Pug the dog" symbol 160. The player is awarded for each of these items and bonus game play proceeds to a second stage or event, as shown in FIG. 5.

Figure 5:
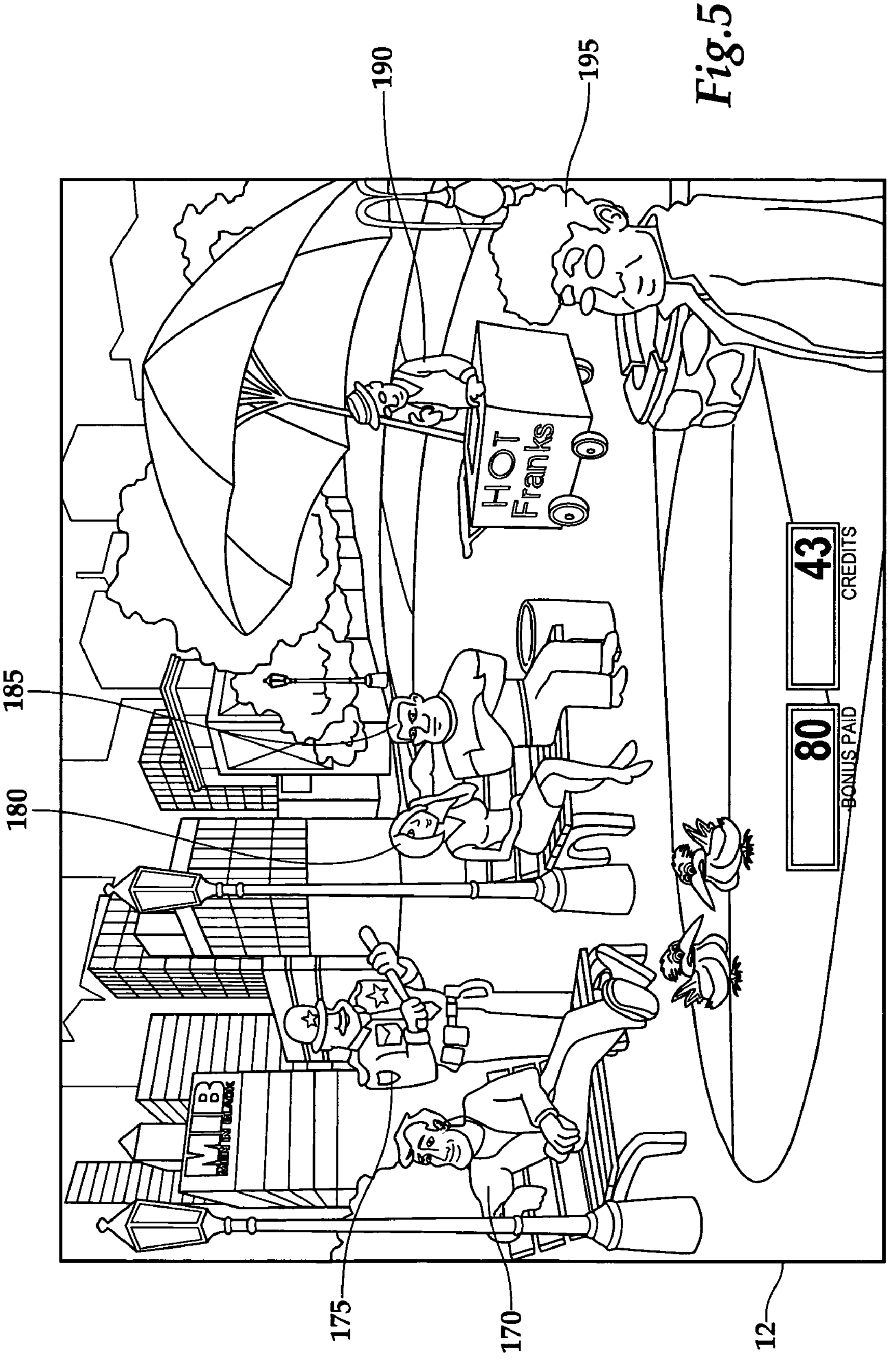
FIG. 5 illustrates a plurality of player-selectable elements displayed during the second stage or event of the bonus game.

FIG. 5 illustrates a plurality of player-selectable elements displayed during the second stage or event of the bonus game. The displayed player-selectable elements include a first male pedestrian 170, a policeman 175, a female pedestrian 180, a second male pedestrian 185, a hot dog vendor 190, and a third male pedestrian 195. The purpose of the second stage or event in the bonus game is for the player to select a disguised alien from among the player-selectable elements. In this example, five of the six player-selectable elements are associated with humans, and one of the six player-selectable elements is associated with an alien disguised as a human. If the player successfully selects the player-selectable element for the alien disguised as a human, the player is awarded with a large payout and/or another valuable award. However, if the player selects a player-selectable element that is, in fact, human, and not a disguised alien, the player is awarded a smaller payout and/or other less valuable award. In other embodiments, more or fewer than six total player-selectable elements may be utilized. Also, more than one of the player-selectable elements may disguise or mask an alien in other embodiments. Additional embodiments also allow the player to make more than one selection in an attempt to locate the disguised alien.

Figure 6A:
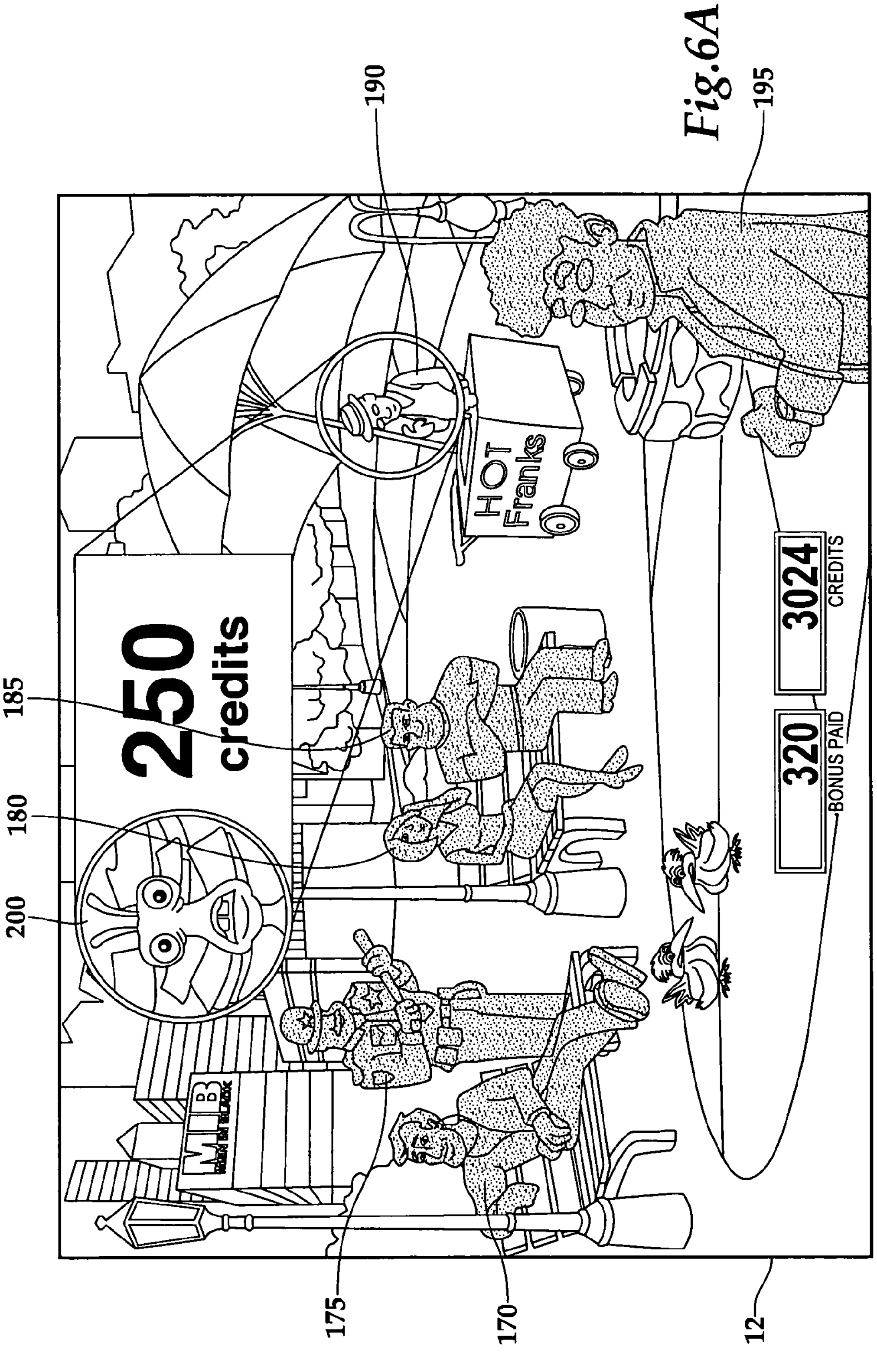
FIGS. 6A and 6B illustrate the displayed screen being "scanned" to determine which of the player-selectable elements is an alien disguised for masked as a human.
Figure 6B:
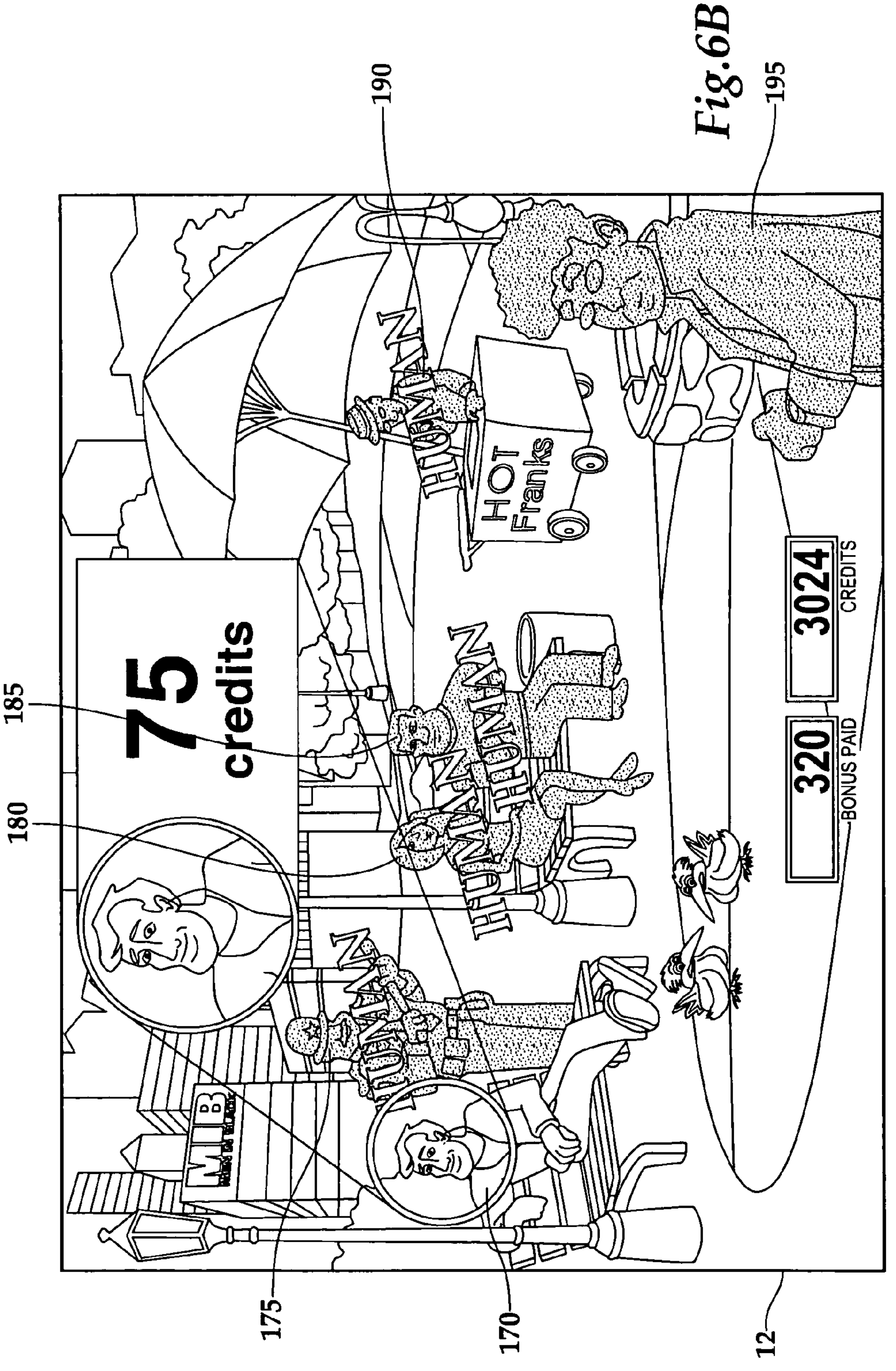

After the player has made the selection of one of the player-selectable elements, the selected player-selectable element is "scanned" to determine whether the selected player-selectable element is an alien disguised as a human, as shown in FIGS. 6A and 6B. In FIG. 6A, the player has selected the hot dog vendor 190 and, as shown, the hot dog vendor 190 is scanned. As illustrated, the player correctly selected the hot dog vendor 190 as the disguised alien. Accordingly, the player is awarded a 250 credit bonus. The other player-selectable elements (i.e., 170, 175, 180, 185, and 195) were humans. The color of these other player-selectable elements may darken to indicate that they are not being scanned. The upper body or head of the selected player-selectable element, which in this case is the alien disguised as the hot dog vendor 190, is enlarged and displayed in a separate window 200 on the display.

In another example, as shown in FIG. 6B, the first male pedestrian 170 is selected by the player and is subsequently scanned. As illustrated, the first male pedestrian 170 is a human, not the disguised alien. Accordingly, the player is awarded 75 credits, a lesser amount than the 250 credits that the player would have been awarded if the correct selection had been made. The other player-selectable elements that are humans may have the text "HUMAN" displayed on them, as shown with respect to the policeman 175, the female pedestrian 180, the second male pedestrian 185, and the hot dog vendor 190. However, the text "HUMAN" is not displayed over the third male pedestrian 195 because the third male pedestrian 195 is the alien.

Figure 7:
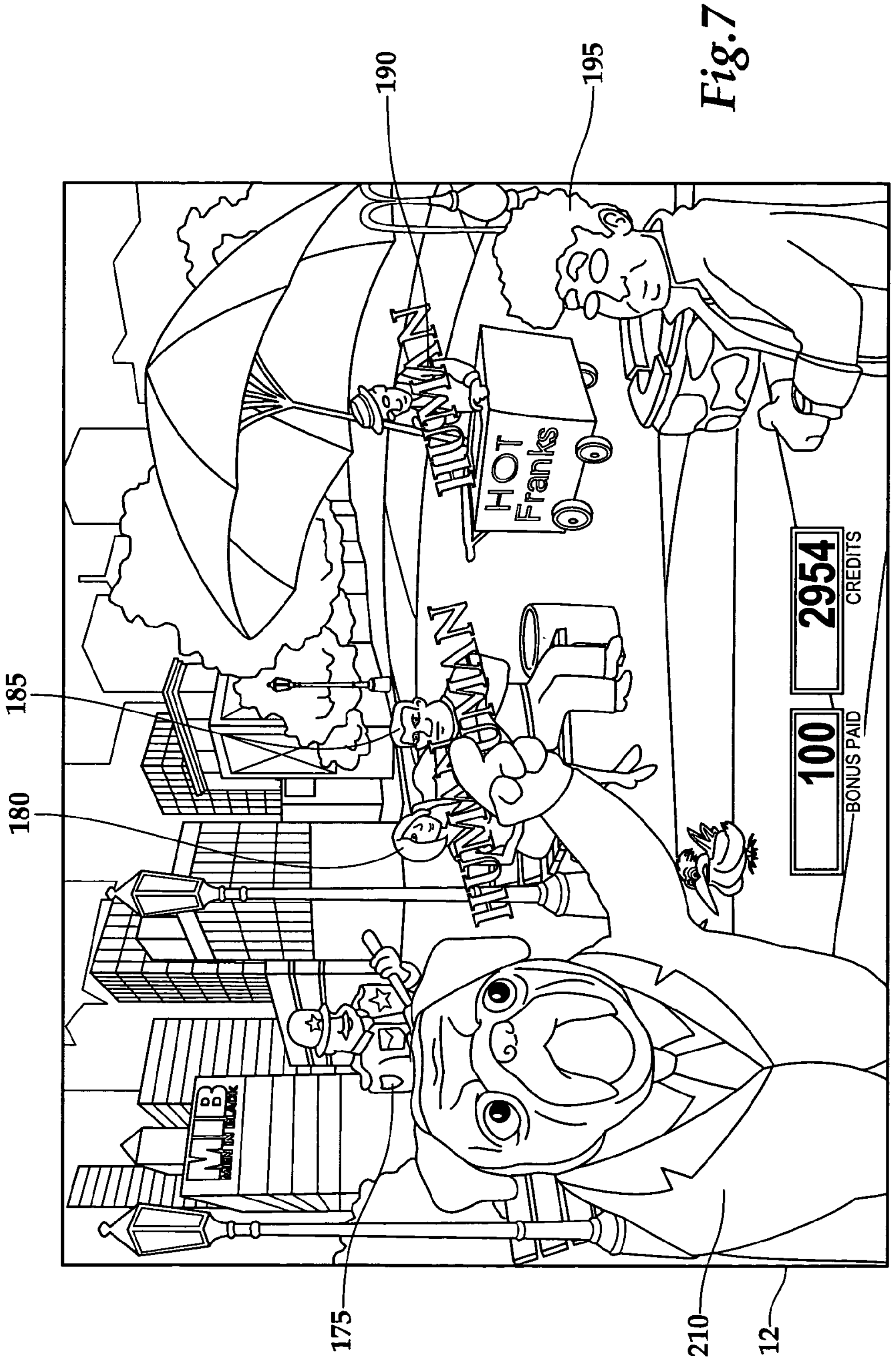
FIG. 7 illustrates another screen shot where several of the player-selectable elements are removed from consideration.

FIG. 7 illustrates another screen shot where "Pug the dog" 210 is displayed and several of the player-selectable elements are removed from consideration. As discussed above with respect to FIGS. 5A and 5B, if the player has selected the player-selectable element revealing the "Pug the dog" symbol during the selection stage shown in FIGS. 4A and 4B, then the player's probability of winning a large payout during the second stage is increased and the large image of "Pug the dog" 210 is displayed during this stage, as shown in FIG. 7. "Pug the dog" 210 then indicates, e.g., three of the six player-selectable elements that do not mask the alien. As shown, the word "HUMAN" is displayed on top of three of the player-selectable elements (i.e., 180, 185, and 190), leaving three remaining player-selectable elements (i.e., 170, 175, and 195) from which the player can make a selection. The player now has a one in three chance of correctly selecting the alien disguised as a human, instead of a one in six chance of making the correct selection as the player would have had if the three player-selectable elements had not been removed. Accordingly, based on the occurrence of an event in the bonus game, (i.e., the selection of a player-selectable element masking the "Pug the Dog" symbol in FIGS. 4A and 4B), the probability of the player achieving a subsequent event or outcome (i.e., being awarded a large payout or award in response to correctly selecting a player-selectable element masking an alien as shown in FIGS. 5-7) is improved.

The three player-selectable elements that are removed from consideration may be randomly selected. In other embodiments, more or fewer than three selections of the player-selectable elements are removed from consideration. The player subsequently selects one of the player-selectable elements and if, e.g., the player-selectable element masking the alien is selected, the player receives a larger bonus or payout than would have been received if the player had not correctly selected the player-selectable element masking the alien. After the player receives the payout, the basic game resumes.

In summary, the "Find the Alien Bonus" game increase the probability or odds of the player achieving a certain outcome such as a large payout during a later segment of the bonus game when the player has achieved a certain outcome during a first segment of the bonus game. Achievement of that certain outcome during the first segment of the bonus game therefore, in effect, increases the expected value ("EV") of the later segment of the bonus game.

Another type of bonus game triggered through basic game play is the "Neuralizer Bonus" game. The "Neuralizer Bonus" game may be triggered, e.g., by a combination of at least three scattered "Neuralizer Bonus" symbols across reels of the slot wagering game. In other words, if at least three "Neuralizer Bonus" symbols are displayed anywhere on the reels the player will be awarded the "Neuralizer Bonus" game. In other embodiments, the "Neuralizer Bonus" game is only available when the player has wagered on the maximum number of pay lines. In additional embodiments, more or fewer than three scattered "Neuralizer Bonus" symbols trigger the "Neuralizer Bonus" game. In other embodiments, the "Neuralizer Bonus" game is triggered only when at least three of the "Neuralizer Bonus" symbols are displayed on an active pay line. When the "Neuralizer Bonus" game is triggered, the player transitions to a pick screen where the player is instructed as to how to play the "Neuralizer Bonus" game.

The "Neuralizer Bonus" game then displays three player-selectable elements to the player, and the player is prompted to select one of the player-selectable elements. In other embodiments, more or fewer than three player-selectable elements are displayed to the player, and/or the player may make more than one selection. The three players-selectable elements may respectively mask awards of a large credit amount, a combination of a smaller credit amount and a free pick, and entry to a "Space Bonus" game. If the player selects the player-selectable element that masks entry to the "Space Bonus" game, the "Space Bonus" game is subsequently displayed on the secondary display 38, as discussed below. In the event that the player selects the player-selectable element that masks the large credit amount, the corresponding large credit amount is displayed and awarded to the player, and the "Neuralizer Bonus" game ends. If the player selects the player-selectable element that masks the combination of the smaller credit amount and the free pick, on the other hand, the corresponding small credit amount is displayed and awarded to the player, and then three player-selectable elements are again displayed and the player is prompted to select one of them. If the player can select the player-selectable elements masking the combination of the small credit amount and the free picks with nine consecutive selections, the potential awards the player can win with the tenth pick are altered. For example, the available awards available with the player's tenth selection include two large credit amounts and one trigger for activating a "Space Bonus" game. If the player selects either of the player-selectable elements that mask a large credit amount, the amount of the corresponding large credit amount is displayed, awarded to the player, and then the "Neuralizer Bonus" game ends.

If the player selects one of the player-selectable elements that mask of the triggers, the "Space Bonus" game is displayed on the secondary display 38. During the "Space Bonus" game, a string of numbers are displayed that rapidly pass over a displayed selection box. The string of number eventually stops moving and the player is awarded, e.g., a credit amount equal to the number displayed in the selection box at that time. The basic game subsequently resumes.

Another available bonus is a wild bonus. The wild bonus is triggered when a wild symbol is displayed that can become part of a winning symbol combination. If the wild symbol is located at, e.g., the middle symbol position on one of the reels, the wild symbol may convert the top and the bottom symbols into wild symbols during an animation displayed to the player. This type of wild symbol is known as an "expanding wild" symbol because it causes multiple symbols to become wild. After the symbols on the reel have been converted to wild, the player may achieve winning combinations on multiple pay lines that would not have been possible if the wild had not expanded across multiple symbol positions.

Each of these embodiments and obvious variations thereof is contemplated as falling within the spirit and scope of the claimed invention, which is set forth in the following claims.

What is claimed is:

1. A gaming machine for playing a wagering game, comprising:

a wager-input device; and at least one display for displaying a basic game and a bonus game of the wagering game, the basic game having at least one bonus game triggering event, the bonus game having a first stage having one or more player-selectable elements and a second stage having one or more player-selectable elements, the second stage further including a plurality of outcomes, at least one of the player-selectable elements of the second stage masking a large bonus payout associated with the bonus game, a probability of winning the large bonus payout associated with the bonus game during the second stage increasing in response to an occurrence of a predetermined event during the first stage, a number of the one or more player-selectable elements in the second stage being reduced in response to the occurrence of the predetermined event during the first stage, wherein the large bonus payout remains fixed during the bonus game and wherein the predetermined event is the selection of a certain player-selectable element from the one or more player-selectable elements during the first stage of the bonus game, and wherein at least one of the one or more player-selectable elements of the first stage differs from at least one of the one or more player-selectable elements of the second stage.

2. The gaming machine of claim 1, wherein the bonus game is triggered in response to an occurrence of the bonus game triggering event during the basic game of the wagering game.

3. The gaming machine of claim 2, wherein the basic game is a slot wagering game having moveable simulated or mechanical reels.

4. The gaming machine of claim 2, wherein the bonus game triggering event is an occurrence of predetermined symbol combination during the basic game.

5. A method of conducting a wagering game on a gaming machine, the method comprising:

triggering a bonus game during a basic game, the bonus game having a first stage having one or more player-selectable elements and a second stage having one or more player-selectable elements;

displaying the bonus game of the wagering game, the bonus game having a plurality of outcomes;

providing a set of selection opportunities to a player;

receiving a first selection of one of the plurality of player-selectable elements during the first stage, the first selection being associated with a first probability of achieving a bonus payout associated with the bonus game; and in response to the first selection being a predetermined one of the plurality of player-selectable elements, increasing a probability of winning the large bonus payout associated with the bonus game for a second selection during the second stage, the probability of selecting the bonus payout for the second selection being greater than the first probability, wherein the bonus payout does not decrease during the bonus game, wherein at least one of the one or more player-selectable elements of the first stage differs from at least one of the one or more player-selectable elements of the second stage.

6. The method of claim 5, wherein a number of the plurality of player-selectable elements is reduced in response to the first selection being the predetermined one of the plurality of player-selectable elements.

7. A computer readable storage medium encoded with instructions for directing a gaming device to perform the method of claim 5.

8. A gaming system for playing a wagering game, comprising:

at least one display; and a controller coupled to the display and programmed to trigger a bonus game during a basic game, display the bonus game of the wagering game, the bonus game including a first stage having a plurality of player-selectable elements and a second stage having one or more player selectable elements, the second stage further having a plurality of outcomes, at least one of the player-selectable elements masking a bonus payout associated with the bonus game, receive a first selection of one of the plurality of player-selectable elements during the first stage, and in response to the first selection being a predetermined one of the plurality of player-selectable elements, increasing a probability of winning the bonus payout for a second selection during the second stage, wherein the bonus payout does not decrease during the bonus game, wherein at least one of the one or more player-selectable elements of the first stage differs from at least one of the one or more player-selectable elements of the second stage.

9. The gaming system of claim 8, wherein the display and the controller are both located within a gaming terminal.

10. The gaming system of claim 8, wherein the display is located within a gaming terminal and the controller is located outside of the gaming terminal.

11. The gaming system of claim 8, wherein a number of the plurality of player-selectable elements is reduced in response to the first selection being a predetermined one of the plurality of player-selectable elements.

12. The method of claim 5, wherein the first stage includes a first plurality of player-selectable elements and the later stage includes a second plurality of player-selectable elements.

13. The gaming system of claim 8, wherein the first stage includes a first plurality of player-selectable elements and the later stage includes a second plurality of player-selectable elements.

14. The gaming machine of claim 1, wherein the first stage further includes a plurality of outcomes that differ from the plurality of outcomes of the second stage.

15. The gaming machine of claim 1, wherein the one or more player-selectable elements of the first stage is a plurality of player-selectable elements, each of the plurality of player-selectable elements of the first stage masking an item of value or an item that ends the player's selection of further player-selectable elements during the first stage.

16. The gaming machine of claim 15, wherein the player is awarded, prior to initiating the second stage, an award corresponding to at least one item of value unmasked by the player responsive to selecting at least one of the player-selectable elements of the first stage.

17. The gaming machine of claim 1, wherein the one or more player-selectable elements of the first stage are located on the at least one display at locations different than locations of the one or more player-selectable elements of the second stage.

18. The gaming machine of claim 1, wherein the one or more player-selectable elements of the first stage are displayed as corresponding graphics on the at least one display and the one or more player-selectable elements of the second stage are displayed as corresponding graphics on the at least one display, the graphics corresponding to the one or more player-selectable elements of the second stage differing from the graphics corresponding to the one or more player-selectable elements of the first stage.

* * * * *